UNITED STATES PATENT OFFICE.

EDWARD S. DAWSON, JR., OF SCHENECTADY, NEW YORK, ASSIGNOR TO GENERAL ELECTRIC COMPANY, A CORPORATION OF NEW YORK.

RESINOUS COMPOSITION AND PROCESS OF MAKING THE SAME.

1,141,944.     Specification of Letters Patent.     Patented June 8, 1915.

No Drawing.     Application filed April 9, 1914. Serial No. 830,802.

*To all whom it may concern:*

Be it known that I, EDWARD S. DAWSON, Jr., a citizen of the United States, residing at Schenectady, county of Schenectady, State of New York, have invented certain new and useful Improvements in Resinous Compositions and the Process of Making the Same, of which the following is a specification.

The present invention relates to the class of resinous organic condensation products made by the chemical interaction of polyhydric alcohols and polybasic acids, and particularly to the class of mixed esters such as described in an application filed September 12, 1912, by W. C. Arsem, Serial No. 719,994.

It is the object of my invention to prepare a resin having a high dielectric strength, and a tenacity and flexibility which enables it to be used for a wide variety of purposes in the electrical art, and which may be converted by a short heat treatment from a fusible to an infusible state.

When two molecular proportions of a polyhydric alcohol, for example, glycerol, are acted upon by three molecular proportions of phthalic acid or its anhydrid, a saturated or neutral soluble, fusible, resinous ester is produced convertible to a tough, hard, infusible, insoluble resin by heat. Other acids, for example, cinnamic, citric, succinic acids, may be similarly combined with polybasic alcohols. A mixed ester may be prepared by substituting for part of the polybasic acid a monobasic acid, such, for example, as oleic acid, thereby producing a flexible resin which adheres tenaciously to bright metallic surfaces.

In accordance with my invention a neutral oily ester such as castor oil as well as a monobasic acid is associated with an unsaturated ester, preferably the glyceryl phthalate, to form a resin convertible to the insoluble, infusible state in less time than the resins described above and having superior insulating and mechanical properties.

The castor oil preferably replaces some of the monobasic acid and preferably is added to the unsaturated resin together with the monobasic acid.

The following specific example illustrates my invention: 92 parts of glycerol are mixed with 148 parts by weight of phthalic anhydrid and gently heated until solution takes place, the temperature then being increased to about 200° C. At this temperature reaction takes place with the evolution of gas. The mass should be kept below a temperature of about 200° C. until the evolution of gas begins to decrease, care being necessary to prevent the reaction from going too far. It should be stopped before the mixture becomes viscous and puffy. Oleic acid and castor oil or a mixture of oleic acid, castor oil and phthalic anhydrid is then added to completely esterify the unsaturated resin. I prefer to add by weight about 70.5 parts of oleic acid, 70.5 parts castor oil and 37 parts of phthalic anhydrid. Due to the chilling effect of the oleic acid when first added, the unsaturated ester becomes viscous, the acid floating on top, but after continued heating slightly below about 200° C. reaction will occur and the layers will gradually become miscible. The reaction is exothermic and with a considerable amount of reacting materials, the temperature may rise to about 260–270° C. unless care is exercised. The mixture becomes a deep red color and at about 200° C. the reaction will be completed after considerable frothing and the evolution of steam and of some uncombined phthalic anhydrid.

In the preferred proportions given in the above example, 1¼ gram molecules of phthalic anhydrid are combined with 1 gram molecule of glycerin, and in place of ¼ gram molecule of phthalic anhydrid necessary to make a neutral ester, oleic acid and castor oil is added. Were oleic acid used alone, this would require ½ gram molecule, that is 141 parts by weight. The castor oil replaces an equal weight of oleic acid for example, 70.5 parts of the 141 parts of oleic acid, may be replaced by 70.5 parts of oil. The amount of castor oil may be varied but preferably no less than one part of castor oil to three parts of oleic acid nor more than three parts of oil to two parts of oleic acid are used. The greater the amount of oil the softer the resin and the longer the time of hardening. The mixed resin thus produced is a thick red liquid which congeals at room temperature to a flexible, viscous resin which will become infusible and insoluble when heated for about fifteen hours at a temperature of about 160° C. A higher temperature lessens the time necessary for the conversion. The castor oil cannot be removed by solvents from the infusible resin. In its infusible state the resin is insoluble in all common solvents including oils.

In some cases I may prepare first a mixed ester, such as glycerol ester of phthalic and oleic acids using such proportions that all the hydroxyl groups of the glycerol have been saturated and then add to this completed mixed resinous ester about 5 to 10% by weight of castor oil.

When the mixture is gently heated the castor oil is in some manner incorporated into the resin so as to produce a homogeneous product. The castor oil may be removed by extraction with ethyl alcohol from the fusible resin but the castor oil cannot be removed by a solvent or other simple means after conversion to the infusible state. It is my opinion that the castor oil forms some sort of chemical combination with the mixed ester when subjected to the final heat treatment.

Other mixed esters may be associated in a similar manner with castor oil, for example, the phthalate-lactate, the phthalate-palmitate, phthalate-benzoate and phthalate-salicylate.

The flexible condensation products produced containing the castor oil may be dissolved in a suitable menstruum, such as benzol, naphtha, turpentine, coal tar oil, and the like, to form a varnish, having adhesive properties superior to a solution of resin unassociated with castor oil. Preferably the resin is given a preliminary heat treatment for 5 to 10 hours to shorten the time required to convert it to the infusible, insoluble state.

The varnish may be used for impregnation of fabric, paper or the like, for the insulation of electrical apparatus or may be applied directly on the surface of electrical conductors as I find it adheres tenaciously to bright metallic surfaces. In the latter case, the dissolved resin is preferably mixed with various mineral fillers as clay, flint, chromium oxid, red oxid of iron and the like, which act as a spacer and as a ready conductor of heat. The coating thus applied may be rendered infusible by heating, without loss of flexibility. The hardened resin is substantially unattacked by dilute alkaline solutions and by chlorin gas. It remains unattacked by dilute acids but is attacked by concentrated nitric acid and concentrated caustic alkali, especially when heated. The completed, unhardened or hardened resin can be saponified with about 10% caustic soda solution to yield glycerin and the sodium salts of phthalic, oleic and ricinoleic acids. When impure oleic acid was used, some sodium palmitate and stearate may also be detected.

What I claim as new and desire to secure by Letters Patent of the United States, is:—

1. A resinous composition comprising a mixed ester of a polyhydric alcohol, a polybasic acid and a monobasic acid, said mixed ester having associated therewith a neutral oily ester, said composition being a flexible, fusible, soluble solid convertible by heat to an insoluble, infusible condition while retaining flexibility.

2. An insulating composition comprising a glycerol ester of phthalic and oleic acids, having associated therewith castor oil, said composition being a fusible, soluble, reddish resin convertible by heat to an infusible, insoluble resin possessing flexibility.

3. A resinous composition comprising a mixed glycerin ester of phthalic and oleic acids, having indistinguishably incorporated therewith castor oil, said composition being convertible by heat to an infusible, insoluble, flexible resin from which the castor oil is non-separable by solvents.

4. A reddish, flexible resin, comprising castor oil and a glycerid of phthalic and oleic acids, the castor oil being extractable by solvents, said resin being convertible by heating to an infusible, insoluble resin from which castor oil is non-extractable.

5. A flexible resinous condensation product saponifiable with alkali to yield glycerin, and the salt of phthalic, oleic and ricinoleic acids.

6. A resinous condensation product, saponifiable with alkali to yield a polyhydric alcohol, and the salts of organic acids, one of which is ricinoleic acid.

7. The process which consists in heating a mixture of an unsaturated ester of a polyhydric alcohol and a polybasic acid with a monobasic acid and castor oil until reaction occurs with the formation of a fusible, soluble resin from which castor oil may be extracted and which is convertible to an infusible, insoluble resin from which castor oil cannot be extracted.

8. The process which consists in heating a mixture of an unsaturated ester of glycerin and phthalic acid with an amount of oleic acid and castor oil equal in weight to the gram-molecular equivalent of oleic acid necessary to completely saturate the ester, until a fusible, soluble resin is produced, convertible by heating to an infusible, insoluble resin from which castor oil cannot be extracted.

9. The process which consists in heating about 92 parts of glycerol with about 148 parts of phthalic anhydrid to the reaction temperature, then adding about 70 parts of oleic acid, about 70 parts of castor oil, and about 37 parts of phthalic anhydrid and continuing heating until at a temperature of about 200° C. a deep red, flexible, fusible, soluble resin is produced convertible by heating to an infusible, insoluble resin while retaining flexibility.

In witness whereof, I have hereunto set my hand this 8th day of April, 1914.

EDWARD S. DAWSON, Jr.

Witnesses:
BENJAMIN B. HULL,
MARGARET E. WOOLLEY.